(12) United States Patent
Hirayama et al.

(10) Patent No.: US 8,526,689 B2
(45) Date of Patent: Sep. 3, 2013

(54) METHOD OF SUPPORTING THE DIFFERENTIATION OF CORNEOCYTES

(75) Inventors: Kenya Hirayama, Yokohama (JP); Taro Katayama, Yokohama (JP); Kazuhiro Yamazaki, Yokohama (JP)

(73) Assignee: Pola Chemical Industries Inc, Shizuoka-shi (JP)

( * ) Notice: Subject to any disclaimer, the term of this patent is extended or adjusted under 35 U.S.C. 154(b) by 884 days.

(21) Appl. No.: 12/526,855

(22) PCT Filed: Feb. 14, 2007

(86) PCT No.: PCT/JP2007/052647
§ 371 (c)(1),
(2), (4) Date: Aug. 12, 2009

(87) PCT Pub. No.: WO2008/099480
PCT Pub. Date: Aug. 21, 2008

(65) Prior Publication Data
US 2010/0111382 A1    May 6, 2010

(51) Int. Cl.
*G06K 9/00* (2006.01)
(52) U.S. Cl.
USPC ......................................................... 382/128
(58) Field of Classification Search
USPC ............ 435/7.21, 7.2, 6.14, 4, 5, 40.5, 287.2; 382/131, 133, 128, 129, 145, 149, 165; 424/9.34, 9.6; 436/63
See application file for complete search history.

(56) References Cited

U.S. PATENT DOCUMENTS

| | | | | |
|---|---|---|---|---|
| 5,891,619 A | * | 4/1999 | Zakim et al. | 435/4 |
| 6,007,996 A | * | 12/1999 | McNamara et al. | 435/6.14 |
| 6,055,325 A | * | 4/2000 | Garini et al. | 382/129 |

(Continued)

FOREIGN PATENT DOCUMENTS

| | | |
|---|---|---|
| JP | 5-183739 A | 7/1993 |
| JP | 07-055707 A | 3/1995 |

(Continued)

OTHER PUBLICATIONS

Diem, M. et al., A decade of vibrational micro-spectroscopy of human cells and tissue (1994-2004). Pres. at 82nd Intl. Bunsen Discussion Meeting on "Raman and IR Spectroscopy in Biology and Medicine", Jena, Germany, Feb. 29-Mar. 2, 2004. (Retr. from Internet May 25, 2012 ). URL: <http://www.ncbi.nlm.nih.gov/pmc/articles/PMC2713762/pdf/nihms121831.pdf>.*

(Continued)

*Primary Examiner* — Lena Najarian
*Assistant Examiner* — Natalie A Pass
(74) *Attorney, Agent, or Firm* — Westerman, Hattori, Daniels & Adrian, LLP (57) ABSTRACT

On the methods of creating corneocyte specimen for providing useful information for appropriate selection of cosmetic products or assessment of the skin condition, it is intended to provide a method of indicating an unstained image of corneocytes or the like in an observable pseudocolor in a method of creating corneocyte specimen, without resorting to staining the corneocyte specimen. The state of corneocytes of skin is input into a computer as an enlarged image by using, for example, a digital microscope. Then, the RGB values of the individual pixels in the image are converted with the use of a conversion system such as a conversion formula, a conversion table or a conversion chart and an image is indicated in a pseudocolor by using the individual RGB values converted.

10 Claims, 10 Drawing Sheets

(56) References Cited

U.S. PATENT DOCUMENTS

| | | | |
|---|---|---|---|
| 6,165,734 A * | 12/2000 | Garini et al. | 435/7.21 |
| 6,486,381 B1 * | 11/2002 | Chambon et al. | 800/18 |
| 2002/0007123 A1 * | 1/2002 | Balas | 600/476 |
| 2003/0026762 A1 * | 2/2003 | Malmros et al. | 424/9.6 |
| 2005/0037439 A1 * | 2/2005 | Bourner et al. | 435/7.2 |
| 2007/0253910 A1 * | 11/2007 | Ahrens et al. | 424/9.34 |
| 2009/0214096 A1 * | 8/2009 | Andrushkiw et al. | 382/131 |
| 2011/0117025 A1 * | 5/2011 | Dacosta et al. | 424/9.6 |
| 2012/0082362 A1 * | 4/2012 | Diem et al. | 382/133 |

FOREIGN PATENT DOCUMENTS

| | | |
|---|---|---|
| JP | 8-163387 A | 6/1996 |
| JP | 11-98372 A | 4/1999 |
| JP | 2000-125854 A | 5/2000 |
| JP | 2003-202336 A | 7/2003 |
| JP | 2003-315331 A | 11/2003 |
| JP | 2004-266335 A | 9/2004 |
| JP | 2005-257451 A | 9/2005 |
| JP | 2005-345191 A | 12/2005 |

OTHER PUBLICATIONS

International Search Report of PCT/JP2007/052647, Mailing Date of May 29, 2007, One Page Only.

Notification of Transmittal of Translation of the International Preliminary Report on Patentability (Form PCT/IB/338) of International Application No. PCT/JP2007/052647 mailed Aug. 27, 2009 with Forms PCT/IB/373 and PCT/ISA/237.

* cited by examiner

METHOD OF SUPPORTING THE DIFFERENTIATION OF CORNEOCYTES

TECHNICAL FIELD

The present invention relates to a color adjusting method for an image. In particular, the present invention relates to a method of displaying in pseudocolor an unstained image of corneocytes or the like, thereby making it possible to differentiate the image.

BACKGROUND ART

Skin conditions momentarily change with variable factors such as a seasonal factor and physical conditions, and also change as a result of skin care taken by applying cosmetics or the like. Accordingly, it is an important factor to appropriately select cosmetics in accordance with the change for the purposes of antiaging and maintaining the skin beautiful in its appearance. For this reason, there have been devised various methods of objectively and scientifically differentiating skin appearances and conditions thereof. An example of those methods includes a method in which corneocytes are collected from the facial skin of a subject by an adhesive tape or an adhesive disk, the corneocytes are stained, and the skin condition is differentiated by using a microscope or the like based on criteria such as the regularity in the alignment of the corneocytes, the shape of the corneocytes, the area of the corneocytes, the degree of exfoliation of the corneocytes, and the presence or absence of a nucleus in the corneocytes.

As for the technology as described above, there have been disclosed methods described below. According to one of the methods, corneocytes are stained brilliant green and gentian violet to differentiate the shape of the corneocytes, based on which the skin condition is estimated, to thereby allow appropriate selection of cosmetics (see, for example, Patent Document 1). Another method includes a dyeing method capable of determining with accuracy the area and the shape of skin corneocytes by using a tannic acid or the like as a mordant (see, for example, Patent Document 2). There has been disclosed further another method capable of easily dyeing corneocytes instantaneously and uniformly by using a liquid dye for corneocytes, the liquid dye containing, equal to or lower than 50% by mass of an alcohol content having from 1 to 4 carbon atoms, a dye, an aromatic alcohol, and an organic acid (see, for example, Patent Documents 3 and 4).

According to the conventional differentiation methods as described above, however, it has often been difficult to secure time required for the dyeing, contamination in the area around the dyeing workplace, or to secure the dyeing workplace itself.

Accordingly, it has been an important issue to develop a skin differentiation method which does not require the dyeing work at all.

However, in reality, the differentiation method as described above which does not require at all the work of dyeing corneocytes has not been realized so far.

Meanwhile, there is a great amount of accumulated analytical data which has been obtained by using stained specimens of corneocytes. Therefore, it is desired for an unstained specimen of corneocytes to allow an easy comparison with the above-mentioned past data.

At the same time, in the field of displays such as television, along with the rapid proliferation of such technologies as a color liquid crystal display technology and a plasma display technology, there has been disclosed a color adjusting method in which fine tones of color, such as shading in an observation target to be displayed as an image, is adjusted and displayed in pseudocolor, to thereby facilitate observation and visual operation (see, for example, Patent Documents 5, 6, and 7). However, no attempt has been implemented at all, by experts in image processing and experts in skin differentiation, to apply the idea in the color adjusting method employed in the above-mentioned image processing to the differentiation of unstained corneocytes, and there has not been found any document indicating the application.

Patent Document 1: Japanese Patent Application Laid-open No. 2003-203336
Patent Document 2: Japanese Patent Application Laid-open No. 2000-125854
Patent Document 3: Japanese Patent Application No. 2004-266335
Patent Document 4: Japanese Patent Application No. 2005-257451
Patent Document 5: Japanese Patent Application Laid-open No. Hei 08-163387
Patent Document 6: Japanese Patent Application Laid-open No. Hei 05-183739
Patent Document 7: Japanese Patent Application Laid-open No. Hei 11-98372

DISCLOSURE OF THE INVENTION

Problems to be Solved by the Invention

In view of the above-mentioned circumstances, the present invention has been made, and therefore, it is an object of the present invention to provide a differentiation method for skin corneocytes which allows to provide information useful in differentiating a skin condition and selecting cosmetics, the method including displaying in observable pseudocolor an unstained image such as corneocytes, without requiring a specimen of the corneocytes to be stained, while allowing a comparison to be made with accumulated results of differentiation on stained corneocytes.

Means for Solving the Problems

The inventors of the present invention have made an extensive effort to search for a technology of displaying in observable pseudocolor an unstained image of corneocytes or the like without requiring the specimen of the corneocytes to be stained, which has not been drawing any attention at all heretofore. As a result of the extensive effort, the inventors of the present invention have found a color adjusting for an image of corneocytes, in which an actual state of skin corneocytes is taken in as an enlarged image picture, the RGB values of the image are converted for each pixel of the image, and the image is displayed in pseudocolor by using the RGB values thus converted, to thereby complete the invention. That is, the present invention is described as follows.

(1) A method of supporting differentiation for corneocytes using a computer comprising the steps of: registering, in a storage device of the computer, stained specimen group data including a plurality of enlarged images of stained specimens of corneocytes, and unstained specimen group data including a plurality of enlarged images of unstained specimens of corneocytes; reading the stained specimen group data and the unstained enlarged specimen group data from the storage device, and comparing both of the data, by a central processing unit of the computer; creating a conversion formula for an RGB value, based on a result of the comparison, by the central processing unit; reading, into the storage device, an image showing a state of corneocytes of skin, as an enlarged image picture, through image taking means connected to the computer; reading out the enlarged image picture and converting the RGB value for each pixel according to the conversion formula, by the central processing unit; and creating pseudocolor image data according to the converted RGB values, developing the pseudocolor image data on an image memory, and displaying the pseudocolor image data on display means, by the central processing unit.

(2) A method of supporting differentiation of an image of corneocytes using a computer according to Item (1), wherein the conversion formula used for converting the RGB value for each pixel is replaced by one of a conversion table and image data stored in advance in the storage device.

(3) A method of supporting differentiation of an image of corneocytes using a computer according to Item (1) or (2), wherein the color adjustment for the corneocytes makes it possible to differentiate, on the display device, a degree of exfoliation in the horny layer, an area of the corneocytes, and/or regularity of alignment of the corneocytes, as the state of the corneocytes.

(4) A computer-executable program of adjusting color of an image of corneocytes, the computer executable program of supporting differentiation of corneocytes comprising the steps of: registering, in a storage device of the computer, stained specimen group data including a plurality of enlarged images of stained specimens of corneocytes, and unstained specimen group data including a plurality of enlarged images of unstained specimens of corneocytes; reading the stained specimen group data and the unstained enlarged specimen group data from the storage device, and comparing both of the data, by a central processing unit of the computer; creating a conversion formula for an RGB value, based on a result of the comparison, by the central processing unit; reading, into the storage device, an image showing a state of corneocytes of skin, as an enlarged image picture, through image taking means connected to the computer; reading out the enlarged image picture and converting the RGB value for each pixel according to the conversion formula, by the central processing unit; and creating pseudocolor image data according to the converted RGB values, developing the pseudocolor image data on an image memory, and displaying the pseudocolor image data on display means, by the central processing unit.

(5) A computer-readable storage medium storing a program of supporting differentiation of corneocytes, the program of supporting differentiation of corneocytes comprising the steps of: registering, in a storage device of the computer, stained specimen group data including a plurality of enlarged images of stained specimens of corneocytes, and unstained specimen group data including a plurality of enlarged images of unstained specimens of corneocytes; reading the stained specimen group data and the unstained enlarged specimen group data from the storage device, and comparing both of the data, by a central processing unit of the computer; creating a conversion formula for an RGB value, based on a result of the comparison, by the central processing unit; reading, into the storage device, an image showing a state of corneocytes of skin, as an enlarged image picture, through image taking means connected to the computer; reading out the enlarged image picture and converting the RGB value for each pixel according to the conversion formula, by the central processing unit; and creating pseudocolor image data according to the converted RGB values, developing the pseudocolor image data on an image memory, and displaying the pseudocolor image data on display means, by the central processing unit.

Effects of the Invention

According to the present invention, there is no need to dye a specimen of corneocytes, which also eliminates the need to provide the processes of dyeing, cleaning, and drying of the specimen of corneocytes, to thereby attain a large reduction in cost in terms of time required, space, equipment, and the like.

BRIEF DESCRIPTION OF THE DRAWINGS

FIG. 9 is a conversion table for the RGB value conversion for displaying an image in pseudocolor.

BEST MODE FOR CARRYING OUT THE INVENTION

The present invention is characterized in that a specimen of corneocytes collected from skin is input to a computer as an enlarged image picture without being stained, the RGB values of the image are converted for each pixel of the image, and the image is displayed in pseudocolor by using the RGB values thus converted. A detailed description of the present invention is given below.

A computer used in an embodiment of the present invention includes a personal computer, and may also include an office computer or a PDA (Personal Data Assistant).

Figure 10:
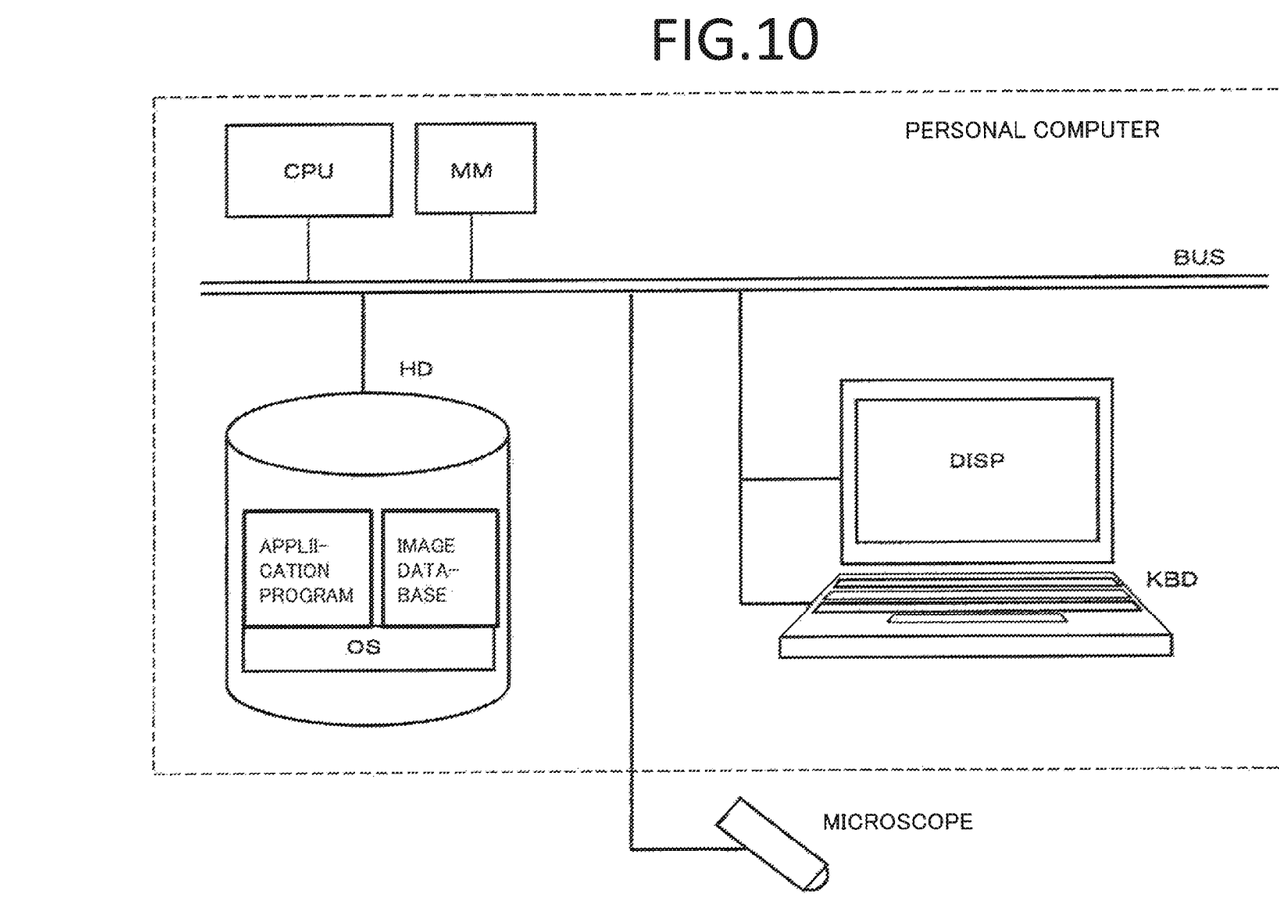
FIG. 10 is a configuration diagram of a computer used in the embodiment of the present invention.

The computer generally includes, as illustrated in FIG. 10, a central processing unit (CPU) at the center thereof, a main memory (MM), a hard disk device (HD), a display device (DISP), and an input device (KDB), which are connected through a bus (BUS). The hard disk device (HD) includes an application program installed therein together with an operating system (OS). The central processing unit (CPU) reads the application program through the bus (BUS) and the main memory (MM) to sequentially execute processing of the application program, thereby implementing the embodiment of the present invention described below.

A specimen of corneocytes to be collected from skin can be obtained by stripping the skin by an adhesive body. Preferable examples of the adhesive body include adhesive transparent tape such as cellophane tape and an adhesive disk formed of a polyethylene terephthalate plate on which an adhesive agent is applied. Of the examples, the adhesive tape is more preferable, which is commercially available and extremely easy to obtain. A sample obtained by stripping the skin by the adhesive body can be taken in as an enlarged image picture without modification.

As a method of taking in the sample as an enlarged image picture, a digital microscope provided with an image pickup device such as a CCD or a CMOS may be preferably used. The microscope is connected to the bus (BUS) of the computer through an interface (I/O). The image taken by the digital microscope is processed by the central processing unit (CPU) in which a predetermined program is read, and accumulated in an image database of the hard disk device (HD). The specimen of corneocytes is converted into an image as described above, thereby making it possible to differentiate the corneocytes in terms of its shape, in particular, the degree of exfoliation or the like of the corneocytes. Examples of the above-mentioned digital microscope include: a cosmetic microscope of MORITEX Corporation; a USB video microscope of Fortissimo Corporation; a DEGITAL MICROSCOPE of Scalar Corporation; and a digital microscope of Keyence Corporation. It is preferable that the magnifying power for the image taking be changed in accordance with the type of differentiation to be performed for the shape of corneocytes. For example, the magnifying power may preferably be set to 50 to 200 diameters (magnifying power with respect to a display) in differentiating the degree of exfoliation of corneocytes, while the magnifying power may preferably set to 500 to 1,000 diameters in differentiating regularity in the alignment of corneocytes.

A color adjustment for an image can be made as described below.

(Process 1)

The central processing unit (CPU) stores in advance specimen group data of images of stained specimens of corneocytes as an image database, in the hard disk device. The specimen group data is compared with specimen group data of unstained enlarged image pictures of corneocytes taken in by the microscope and provided as image data, to thereby create an RGB conversion system. Examples of the conversion system preferably include a conversion formula, a conversion table, and a conversion chart.

(Process 2)

Figure 1:
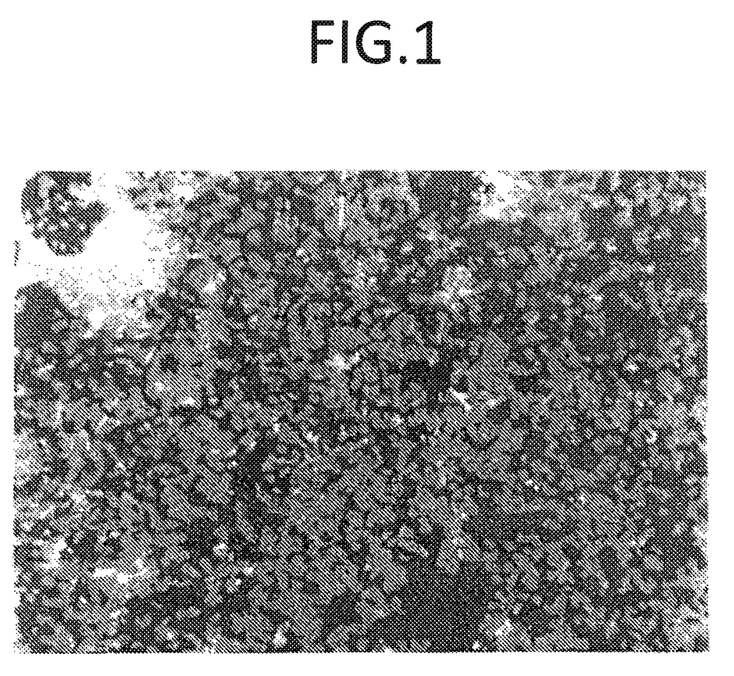
FIG. 1 is a view (figure-substitute photograph) showing an enlarged image picture for evaluating the degree of exfoliation of unstained corneocytes.
Figure 2:
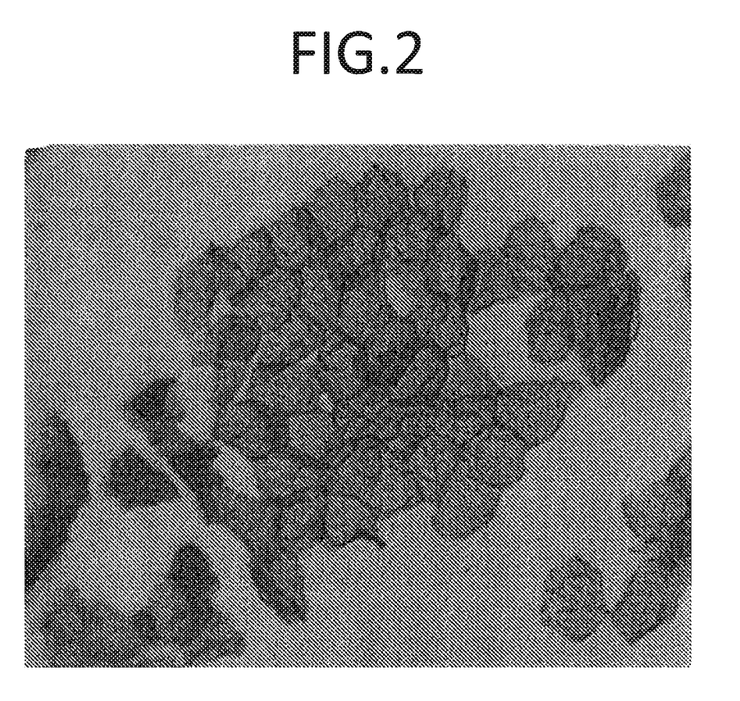
FIG. 2 is a view (figure-substitute photograph) showing an enlarged image picture for evaluating regularity in the alignment of unstained corneocytes.

Next, the central processing unit (CPU) obtains an RGB value for each pixel of an enlarged image picture (see FIGS. 1 and 2) in the unstained specimen group read out from the hard disk device (HD).

(Process 3)

Next, the central processing unit (CPU) converts the RGB value for each pixel (input RBG value) by using the conversion formula, the conversion table, or the conversion chart for each above-mentioned RGB, to thereby obtain an RBG value (output RGB value).

(Process 4)

Figure 3:
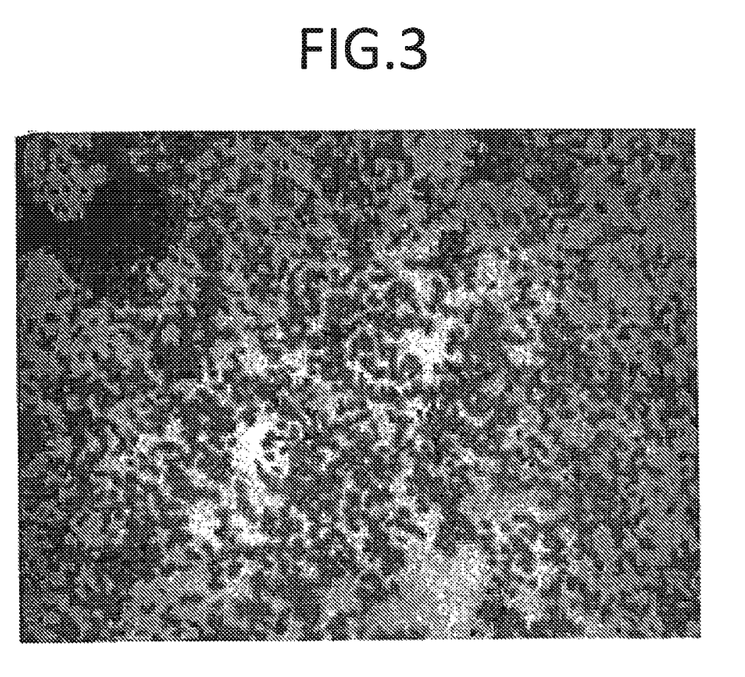
FIG. 3 is a view (figure-substitute photograph) showing an image displayed in pseudocolor, which is obtained through the RGB conversion, for evaluating the degree of exfoliation of corneocytes.
Figure 4:
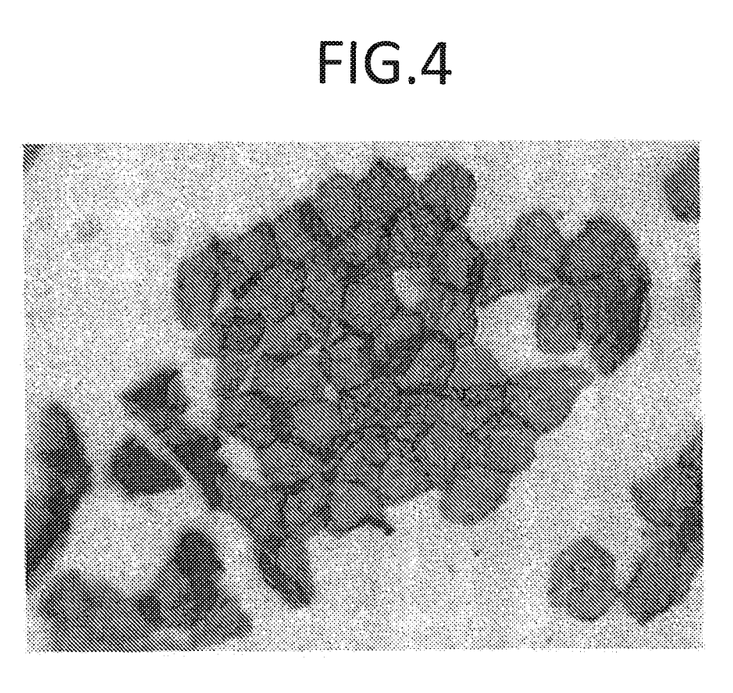
FIG. 4 is a view (figure-substitute photograph) showing an image displayed in pseudocolor, which is obtained through the RGB conversion, for evaluating regularity in the alignment of corneocytes.

Next, the central processing unit (CPU) creates a pseudocolor display image (see FIGS. 3 and 4) based on the calculated RGB values, develops the image for a video RAM (not shown), to thereby display the image on the display device. At this time, the pseudocolor display image may be printed in color by using a printing device (not shown).

As the conversion formula, each of the formulae defined as described below may be preferably used. Each of the following formulae is an example of the formula obtained as a result of Process 1.

Output $R = 3E-05r^3 - 0.0085r^2 - 0.4800r + 255$

Output $G = 3E-05g^3 - 0.0126g^2 + 0.2879g + 255$

Output $B = 4E-06b^3 - 0.0022b^2 + 0.0759b + 255$

Here, r, g, and b denote input R, G, and B values, respectively.

Figure 5:
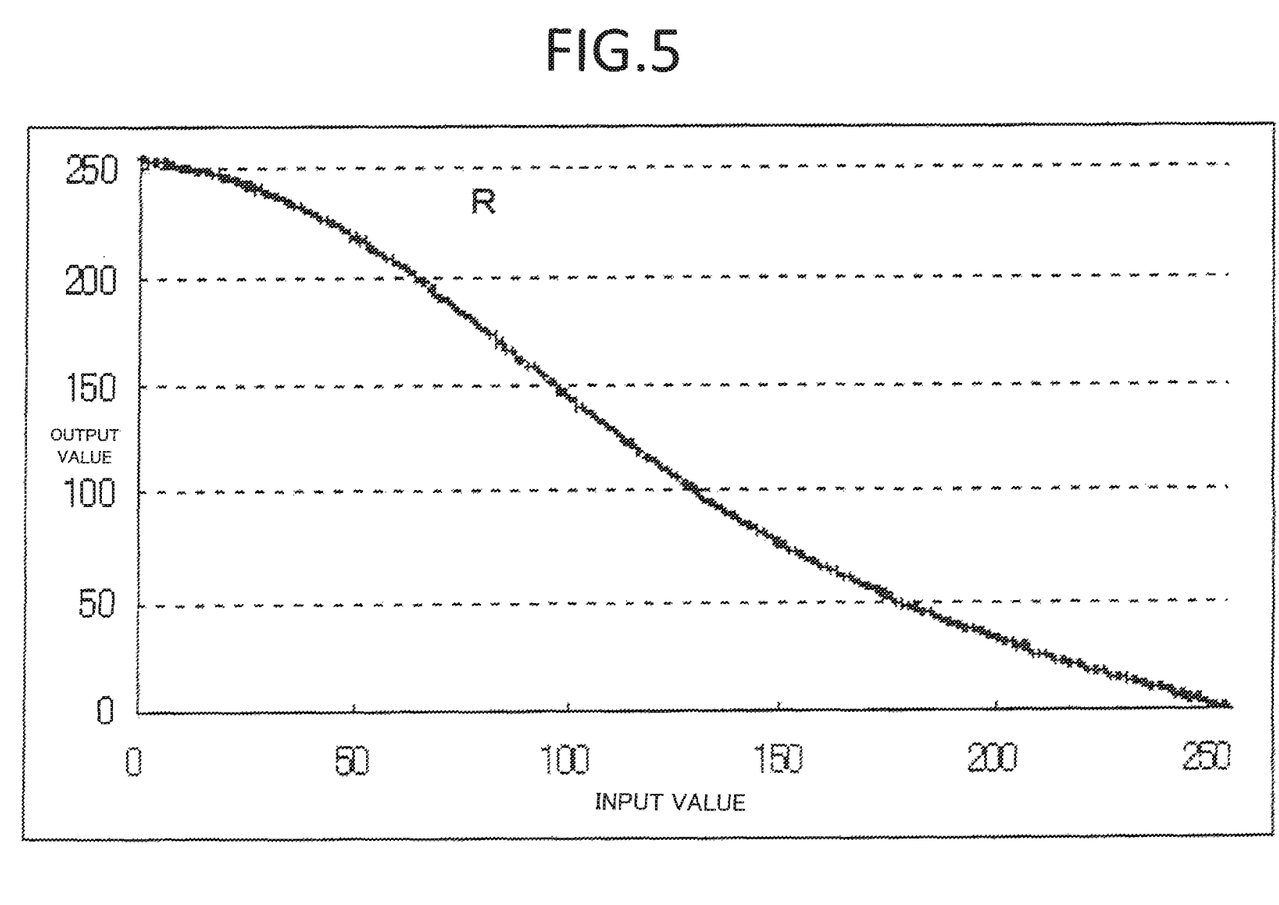
FIG. 5 is a conversion chart for the R value conversion for displaying an image in pseudocolor.
Figure 6:
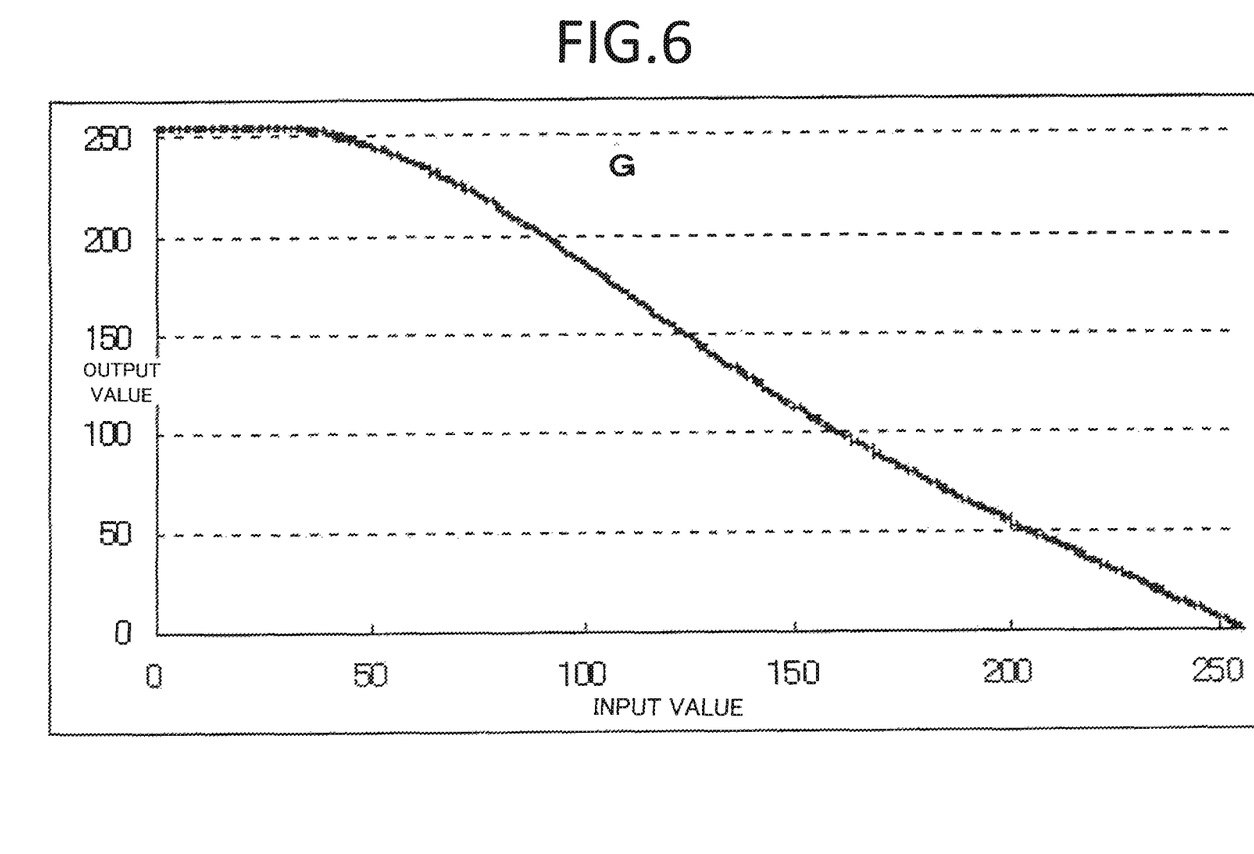
FIG. 6 is a conversion chart for the G value conversion for displaying an image in pseudocolor.
Figure 7:
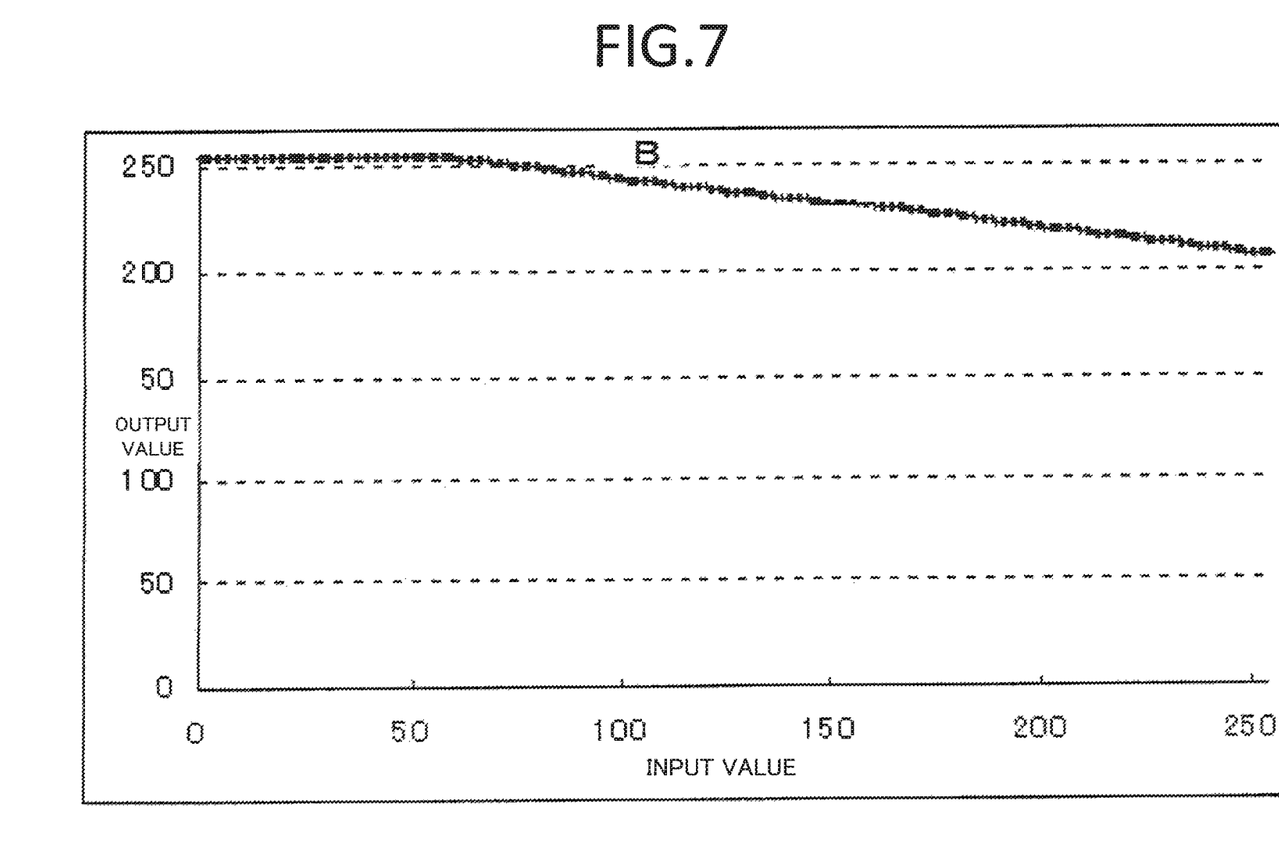
FIG. 7 is a conversion chart for the B value conversion for displaying an image in pseudocolor.
Figure 8:
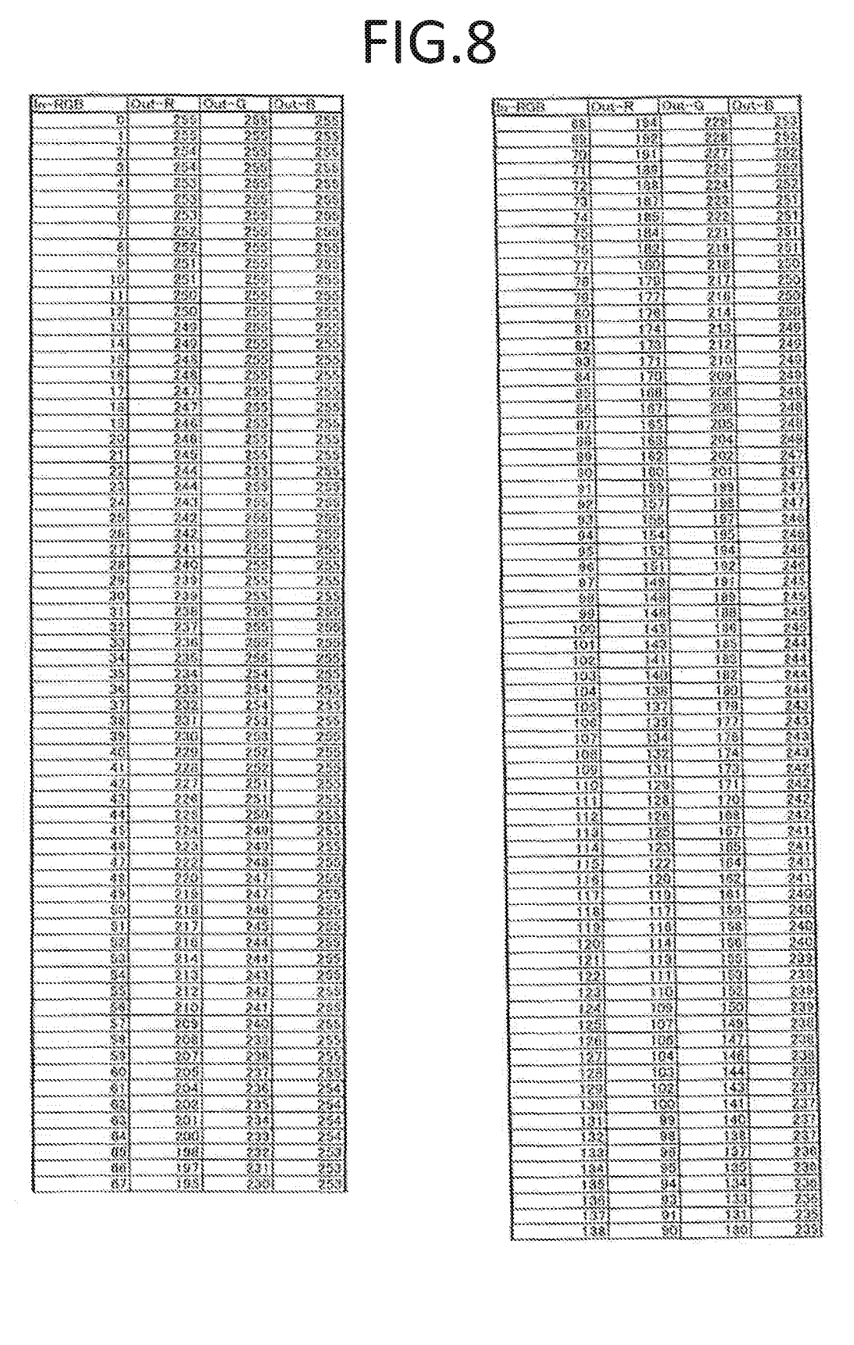
FIG. 8 is a conversion table for the RGB value conversion for displaying an image in pseudocolor.

In a case where a conversion chart is used as the conversion system, the conversion charts shown in FIGS. 5 to 7 (graph charts in which the abscissa indicates input values and the ordinate indicates output values) may preferably be used for each output of R, G, and B. In a case where a conversion table is used as the conversion system, a correspondence table of input RBG values (In-RGB) and output RGB values (Out-R, Out-G, and Out-B) as shown in FIGS. 8 and 9 may preferably be used. The conversion formula, the conversion chart, or the conversion table described above does not exert any influence on the color in the pseudocolor display or on the state of the corneocytes, and may be incorporated as software (program or table) in the computer so as to be processed instantly in a way no different from one another.

The pseudocolor image picture displayed on the display device as described above can be used for differentiating the state of corneocytes, for example, the degree of exfoliation in the horny layer, the area of the corneocytes, regularity in the alignment of the corneocytes. The differentiation of the state can be made by a counselor viewing the display device. Alternatively, the differentiation may also be made by an image analysis processing executed by a program. Further, by using the differentiation result obtained as described above, it is possible to provide information useful in providing counseling for skin conditions or in selecting cosmetics. Also, the pseudocolor image as described above may be attached to a photograph medium or a counseling sheet output from the display device or the printing device, which makes it possible to give advice or provide counseling effectively.

In the following, the present invention is further described with reference to examples. However, it is needless to say that the present invention is not limited to the examples described below.

Example 1

The method of displaying an image of an unstained specimen of corneocytes in an observable manner without using a liquid dye according to the present invention was tested for accuracy in visual evaluation. Specimens of corneocytes were collected from the skin of three women having different skin conditions. An image of the unstained specimens of corneocytes were each displayed according to the above-mentioned color adjusting process of the present invention by using Adobe Photoshop (registered trademark) of Adobe Systems Incorporated (see FIG. 1), and the image was subjected to the RGB conversion by using the above-mentioned RGB conversion chart, to thereby obtain the image displayed in pseudocolor (see FIG. 3). Next, the specimens of corneocytes were each stained gentian violet and brilliant green as in the conventional method, and an enlarged image picture thereof was obtained. The image displayed in pseudocolor according to the present invention and the enlarged image picture stained gentian violet and brilliant green (see Patent Document 1) were tested for evaluation capability in three evaluation items, that is, the alignment regularity, the area, and the degree of exfoliation of the corneocytes obtained from the three women. Also, Table 1 shows time and cost required for obtaining an image of the evaluation target.

According to Table 1, the present invention and the conventional method bear no difference therebetween in evaluation accuracy of corneocytes, while the present invention excels in terms of cost, time required, space, and the like, which indicates that the method of displaying an unstained image in pseudocolor through color adjustment according to the present invention is adequate for being used in the corneocyte evaluation or the like.

TABLE 1

| Comparison Result | Method of the Present Invention | Conventional Staining Method | Comments |
| --- | --- | --- | --- |
| Evaluation Accuracy | Good | good | Both are on an equivalent level |
| Cost | low | high | There is a significant difference |
| Time Required | short | long | Several seconds versus several tens of minutes to hours |

Example 2

In Example 1, the number of persons to be tested was increased to 104, and the measurement accuracy of the present invention was examined in detail. The area of the corneocytes was measured by using WinROOF of Mitani Corporation, while the degree of exfoliation and the alignment regularity were visually evaluated on a 5-point scale and a 4-point scale by three trained evaluators according to a standardized evaluation system.

The correlation coefficients (r) in terms of the alignment regularity, the area, and the degree of exfoliation of corneocytes were obtained as of 0.932, 0.966, and 0.945, respectively, between the enlarged image picture of the present invention and that of the conventional method. Those correlation coefficients exhibit significance and a strong correlation between the images. With consideration given to that the images are based on different specimens of corneocytes collected from adjacent regions, it can be considered that the images exhibit extremely high compatibility, which indicates that the method of displaying an unstained image in pseudocolor through color adjustment according to the present invention is adequate for being used in the corneocyte evaluation or the like.

INDUSTRIAL APPLICABILITY

According to the present invention, in preparing a specimen of corneocytes, there is no need to dye the specimen of corneocytes, which also eliminates the need to provide processes of dyeing, cleaning, and drying of the specimen of corneocytes, to thereby attain a large reduction in cost in terms of time required, space, equipment, and the like. Further, for example, when providing a customer with skin counseling or beauty counseling or selecting cosmetics for the customer in a shop or a department store where time and space are limited, it is possible to provide information useful to the customer speedily without losing any opportunity.

The invention claimed is:

1. A method of supporting differentiation of an image of corneocytes using a computer, comprising:

registering, in a storage device of the computer, stained specimen group data including a plurality of enlarged images of stained specimens of corneocytes, and unstained specimen group data including a plurality of enlarged images of unstained specimens of corneocytes;

reading the stained specimen group data and the unstained enlarged specimen group data from the storage device, and comparing both of the data, by a central processing unit of the computer;

creating a conversion formula for an RGB value, based on a result of the comparison, by the central processing unit;

reading, into the storage device, an image showing a state of corneocytes of skin, as an enlarged image picture, through image taking means connected to the computer;

reading out the enlarged image picture and converting the RGB value for each pixel according to the conversion formula, by the central processing unit; and creating pseudocolor image data according to the converted RGB values, developing the pseudocolor image data on an image memory, and displaying the pseudocolor image data on a display device, by the central processing unit.

2. The method of supporting differentiation of an image of corneocytes using a computer according to claim 1, wherein the conversion formula used for converting the RGB value for each pixel is replaced by one of a conversion table and image data stored in advance in the storage device.

3. The method of supporting differentiation of an image of corneocytes using a computer according to claim 1, wherein the color adjustment for the corneocytes makes it possible to differentiate, on the display device, a degree of exfoliation in layer of corneocytes, an area of the corneocytes, and/or regularity of alignment of the corneocytes, as the state of the corneocytes.

4. A non-transitory computer-readable medium storing a program of supporting differentiation of corneocytes, the program of supporting differentiation of corneocytes comprising:

registering, in a storage device of the computer, stained specimen group data including a plurality of enlarged images of stained specimens of corneocytes, and a plurality of sets of unstained specimen group data including a plurality of enlarged images of unstained specimens of corneocytes;

reading the stained specimen group data and the unstained enlarged specimen group data from the storage device, and comparing both of the data, by a central processing unit of the computer;

creating a conversion formula for an RGB value, based on a result of the comparison, by the central processing unit;

reading, into the storage device, an image showing a state of corneocytes of skin, as an enlarged image picture, through image taking means connected to the computer;

reading out the enlarged image picture and converting the RGB value for each pixel according to the conversion formula, by the central processing unit; and creating pseudocolor image data according to the converted RGB values, developing the pseudocolor image data on an image memory, and displaying the pseudocolor image data on display means, by the central processing unit.

5. A method of supporting differentiation of an image of corneocytes using a computer, comprising:

storing, into a storage device, an image showing a state of unstained corneocytes of skin, as an enlarged image picture, by a processor;

reading out the enlarged image picture and converting an RGB value for each pixel according to a conversion formula, by the processor, wherein the conversion formula for the RGB values is obtained on the basis of a result of a comparison between group data of stained corneocyte specimen and group data of unstained corneocyte specimens; and generating pseudocolor image data according to the converted RGB values, developing the pseudocolor image data on an image memory, and displaying the pseudocolor image data on a display device, by the processor.

6. The method according to claim 5, wherein the conversion formula used for converting the RGB value for each pixel is replaced by one of a conversion table and image data stored in advance in the storage device.

7. The method according to claim 5, wherein the color adjustment for the corneocytes makes it possible to differentiate, on the display device, a degree of exfoliation in layer of corneocytes, an area of the corneocytes, and/or regularity of alignment of the corneocytes, as the state of the corneocytes.

8. A method of supporting differentiation of an image of corneocytes using a computer, comprising:
  storing, into a storage device, an image showing a state of corneocytes of skin, as an enlarged image picture, by a processor;
  reading out the enlarged image picture and converting an RGB value for each pixel using one of a conversion table and image data stored in the storage device, by the processor, wherein the one of the conversion table and image data for the RGB values is obtained on the basis of a result of a comparison between group data of stained corneocyte specimens and group data of unstained corneocyte specimens; and
  generating pseudocolor image data according to the converted RGB values, developing the pseudocolor image data on an image memory, and displaying the pseudocolor image data on a display device, by the processor.

9. A computer supporting differentiation of an image of corneocytes, comprising:
  a storage device; and
  a processor to execute processes including:
  generating a conversion formula for RGB values which is obtained on the basis of a result of a comparison between group data of stained corneocyte specimens and group data of unstained corneocyte specimens;
  storing, into the storage device, an image showing a state of corneocytes of skin, as an enlarged image picture;
  reading out the enlarged image picture and converting an RGB value for each pixel according to the conversion formula; and
  generating pseudocolor image data according to the converted RGB values, developing the pseudocolor image data on an image memory, and displaying the pseudocolor image data on a display device.

10. A computer supporting differentiation of an image of corneocytes, comprising:
  a storage device; and
  a processor to execute processes including:
  storing, into the storage device, an image showing a state of corneocytes of skin, as an enlarged image picture;
  reading out the enlarged image picture and converting an RGB value for each pixel using one of a conversion table and image data stored in the storage device, wherein the one of the conversion table and image data for the RGB values is obtained on the basis of a result of a comparison between group data of stained corneocyte specimens and group data of unstained corneocyte specimens; and
  generating pseudocolor image data according to the converted RGB values, developing the pseudocolor image data on an image memory, and displaying the pseudocolor image data on a display device.

* * * * *